United States Patent
Suh (10) Patent No.: US 8,935,811 B2
(45) Date of Patent: Jan. 13, 2015

(54) VERTICALLY MOUNTED SAMPLE STAGE FOR MICROSCOPY AND SCANNING PROBE MICROSCOPE USING THE SAMPLE STAGE

(71) Applicant: Samsung Electronics Co., Ltd., Suwon-si (KR)

(72) Inventor: Hwan-soo Suh, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/135,710

(22) Filed: Dec. 20, 2013

(65) Prior Publication Data
US 2014/0182020 A1      Jun. 26, 2014

(30) Foreign Application Priority Data
Dec. 20, 2012   (KR) .................... 10-2012-0149757

(51) Int. Cl.
*G01Q 30/20*       (2010.01)
*B82Y 35/00*       (2011.01)

(52) U.S. Cl.
CPC ...... *G01Q 30/20* (2013.01); *B82Y 35/00* (2013.01)
USPC ........ 850/18; 250/440.11; 250/306; 250/307; 850/1

(58) Field of Classification Search
USPC ............ 250/440.11, 306, 307, 310; 850/1, 18
See application file for complete search history.

(56) References Cited

U.S. PATENT DOCUMENTS

| 4,992,660 A | 2/1991 | Kobayashi |
| 7,427,755 B2 | 9/2008 | Ding et al. |
| 2002/0194938 A1* | 12/2002 | Koo et al. .................. 73/864.91 |
| 2010/0171037 A1* | 7/2010 | Bierhoff et al. ............... 250/310 |

FOREIGN PATENT DOCUMENTS

| JP | 2009193811 A | 8/2009 |
| JP | 2011060723 A | 3/2011 |
| KR | 100989749 B1 | 10/2010 |

* cited by examiner

*Primary Examiner* — Jack Berman
*Assistant Examiner* — Meenakshi Sahu
(74) *Attorney, Agent, or Firm* — Sughrue Mion, PLLC (57) ABSTRACT

A sample stage for microscopy includes a sample holder including a body in which a sample-mounting part and a seating part are provided on a bottom of the body and a grip part for a mounting unit is provided on a top of the body, a sample rack, on which the sample holder is mounted, including a supporter supporting the seating part of the sample holder, and an elastic element provided on the sample rack, providing the sample holder with a pressing force inclined with respect to a vertical direction and fastening the sample holder to the sample rack while the seating part is being supported by the supporter. The sample stage may be vertically mounted.

20 Claims, 8 Drawing Sheets

VERTICALLY MOUNTED SAMPLE STAGE FOR MICROSCOPY AND SCANNING PROBE MICROSCOPE USING THE SAMPLE STAGE

CROSS-REFERENCE TO RELATED APPLICATION

This application claims priority from Korean Patent Application No. 10-2012-0149757 filed on Dec. 20, 2012 in the Korean Intellectual Property Office, the disclosure of which is incorporated herein by reference in its entirety.

BACKGROUND

1. Field

Apparatuses consistent with exemplary embodiments relate to sample stages to which samples to be measured are attached or from which they are detached, and scanning probe microscopes using the sample stages.

2. Description of the Related Art

When measuring properties of samples, due to application characteristics or peripheral environments, it is occasionally necessary to tightly fasten specimens while being easily mounted/dismounted at the same time. In the case of microscopes, such as scanning probe microscopy (SPM) apparatuses operating under atmospheric pressure at room temperature, experiments are performed while generally fastening the specimens by using vacuum chucks. Since sample holders having various shapes may be used and samples may be stably fastened by disposing samples on a vacuum chuck and performing an exhaust process to generate a vacuum state, vacuum chucks are extensively used in atmospheric SPM apparatuses of the related art. However, in the case of apparatuses for measuring samples in a vacuum state, since it is impossible to use a force generated by a pressure difference between atmospheric pressure and a bottom surface of a sample holder as a force for fastening a sample holder in a vacuum chuck, a method of fastening a sample by using a vacuum chuck is limited to microscopes used under atmospheric pressure.

SUMMARY

One or more exemplary embodiments provide sample stages for microscopes and scanning probe microscopes using the sample stages, the sample stages being capable of being easily mounted/dismounted and used under atmospheric pressure or lower.

According to an aspect of an exemplary embodiment, there is provided a sample stage for microscopy, capable of being vertically mounted, the sample stage including a sample holder comprising a body having a sample-mounting part and a seating part provided on a bottom of the body; a sample rack, on which the sample holder is mounted, comprising a supporter configured to support the seating part of the sample holder; and an elastic element provided on the sample rack, configured to provide the sample holder with a pressing force inclined with respect to a vertical direction and configured to fasten the sample holder to the sample rack.

The elastic element may be configured to be pushed outward by the sample holder in response to the sample holder being mounted on the sample rack.

The elastic element may include a leaf spring supported by the sample rack.

The elastic element may be formed of one of beryllium copper (BeCu), tantalum (Ta), stainless steel, and Inconel.

The sample rack may further include a recessed part depressed from a top surface of the sample rack configured to receive the body, and a bottom surface of the recessed part may be the supporter.

The sample rack may further include a cavity provided on an outer wall surrounding the recessed part of the sample rack and the sample holder may further include a wing configured to be inserted into the cavity.

The cavity of the sample rack and the wing of the sample holder may be configured to restrict a rotation of the sample holder with respect to the sample rack.

The elastic element may be provided in the cavity.

One of the seating part and the supporter may include two or more V-shaped grooves not parallel to one another and the other of the seating part and the supporter may include a position-determining projection having a globular shape inserted into the V-shaped groove, and the V-shaped groove and the position-determining projection may be configured to restrict a rotation and a lateral movement of the sample holder with respect to the sample rack.

A first electric contact point may be provided on the supporter of the sample rack, and a second electric contact point in contact with the first electric contact point may be provided on the seating part of the sample holder.

According to an aspect of another exemplary embodiment, there is provided a sample stage for microscopy, capable of being vertically mounted, the sample stage including a sample rack comprising a recessed part and a plurality of V-shaped grooves provided on a bottom surface of the recessed part not to be parallel to one another, a sample holder including a body inserted into the recessed part, and a plurality of position-determining projections protruding from a bottom surface of the body and supported by the plurality of V-shaped grooves, and an elastic element provided on the sample rack, configured to provide the sample holder with a pressing force inclined with respect to a vertical direction, and configured to fasten the sample holder to the sample rack.

The elastic element may include a leaf spring providing the sample holder with the pressing force generated by a force of being pushed outward by the sample holder and returning in response to the sample holder being mounted on the sample rack.

The sample rack may further include a cavity provided on an outer wall surrounding the recessed part in the sample rack, and the sample holder may further include a wing configured to be inserted into the cavity may be provided on the sample holder.

The elastic element may be provided in the cavity.

A first electric contact point may be provided on the bottom surface of the sample rack, and a second electric contact point in contact with the first electric contact point may be provided on the bottom surface of the sample holder.

According to an aspect of yet another exemplary embodiment, a scanning probe microscope includes a sample stage as described above, a probe configured to access a sample mounted on the sample-mounting part via a hollow part provided in the sample rack, and a control unit configured to derive a measurement result from at least one of mechanical, electrical, and chemical signals received from the probe.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to like elements throughout. Also, a size or a thickness of each element in the drawings may be exaggerated for clarity of description.

Figure 1:
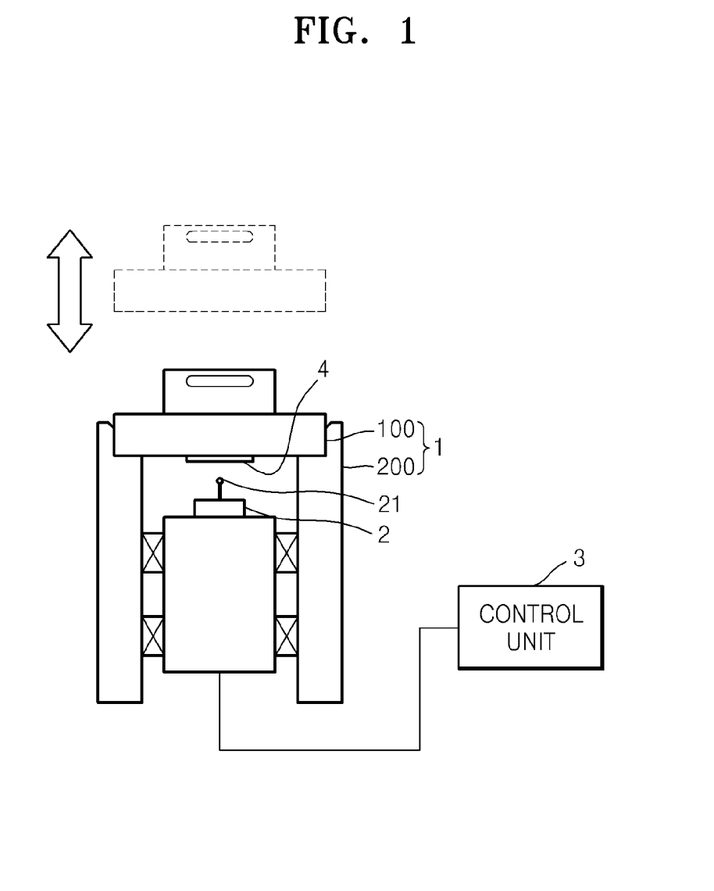
FIG. 1 is a schematic configuration view illustrating a scanning probe microscope according to an exemplary embodiment.

FIG. 1 is a schematic configuration view illustrating a microscope according to an exemplary embodiment. Referring to FIG. 1, the microscope may include a sample stage 1 on which a sample 4 is mounted, a probe 2 accessing the sample 4 and measuring the same, and a control unit 3 controlling a scanning process by using the probe 2 and deriving a measurement result from mechanical, electrical, and chemical signals received from the probe 2.

The microscope of FIG. 1 is a scanning probe microscope. The scanning probe microscope is a microscope for detecting physical and chemical reactions of atoms on a surface of a sample by using the probe 2 including a measuring tip 21. In the related art, as a microstructure of the measuring tip 21 decreases in size, a unit of a physical amount capable of being detected becomes smaller. As examples of the scanning probe microscope, there are scanning tunneling microscopes (STMs) for measuring a tunnel current, atomic force microscopes (AFMs) for detecting a surface indentation by using Van der Waals atomic forces, lateral force microscopes (LFMs) for detecting a surface difference by using a friction force, magnetic force microscopes (MFMs) for detecting properties of a magnetic field by using a magnetic needle, electric field force microscopes (EFFMs) for supplying a voltage between a sample and a probe and measuring an electric field, chemical force microscopes (CFMs) for measuring a surficial distribution of a chemical functional group, scanning capacitance microscopes (SCMs) for measuring a capacitance between a sample and a needle, scanning thermal microscopes (SThMs) for displaying a thermal distribution of a surface in segregated images, and electrochemistry scanning probe microscopes (EC-SPM) for measuring electrochemical properties of a sample. These microscopes generally detect surficial signals while having a high resolution to a level of atoms.

The sample 4 is fixed onto the sample stage 1. The sample stage 1 may include a sample rack 200 and a sample holder 100. The sample rack 200 may form a body of the microscope. The sample 4 is mounted onto the sample holder 100. The sample holder 100 is mounted onto or dismounted from the sample rack 200. The sample stage 1 according to the present exemplary embodiment has a configuration allowing the sample holder 100 to be vertically mounted onto or dismounted from the sample rack 200.

For mounting the sample holder 100 onto the sample rack 200 or for dismounting the sample holder 100 from the sample rack 200, as an example, a vacuum chuck may be used but it is difficult to use the vacuum chuck in apparatuses operating in a vacuum state.

As another example, a screw-coupling method may be used. The method uses a strong coupling torque and the sample holder 100 or the sample rack 200 may be damaged when a male screw and a female screw are jammed in a coupling process.

As another example, a bayonet method may be used, in which the sample holder 100 is rotated at a certain angle while being in contact with the sample rack 200. In this method, since the sample holder 100 is pushed and then rotated while being mounted and is rotated and pulled while being detached, it is a complicated procedure. Also, since a force of a certain level or more and torque are necessary in this process, the sample holder 100 or the sample rack 200 may be damaged.

In the present exemplary embodiment, there is provided the vertical mount type sample stage 1 in which the sample holder 100 may be stably mounted onto and dismounted from the sample rack 200 by simply pushing and pulling.

Figure 2:
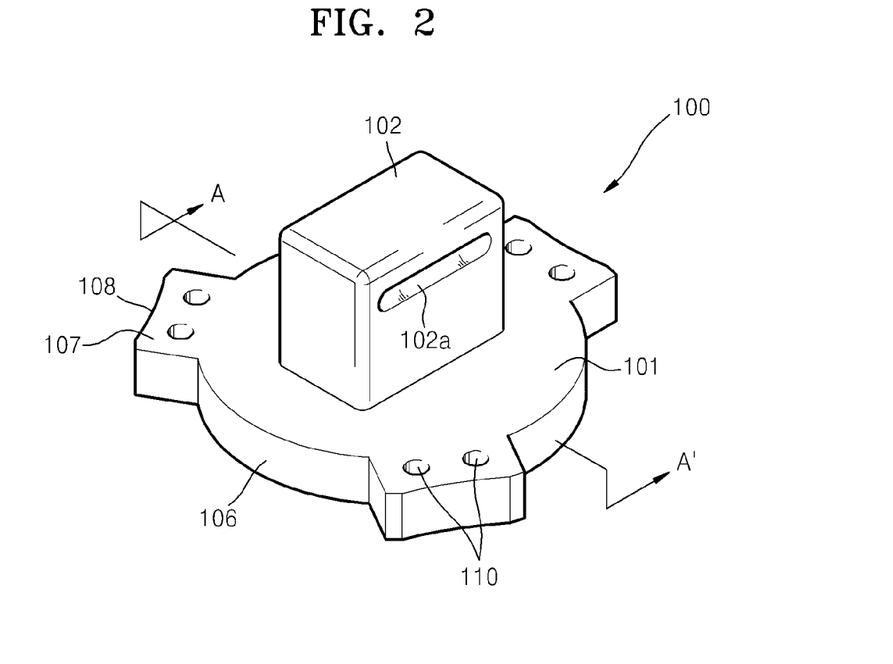
FIG. 2 is a perspective view illustrating a sample holder according to an exemplary embodiment.
Figure 3:
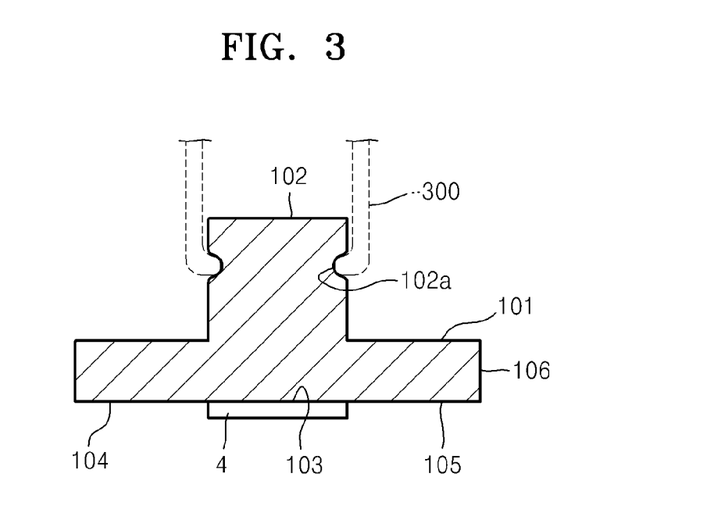
FIG. 3 is a cross-sectional view illustrating the sample holder taken along a line A-A' of FIG. 2.

FIG. 2 is a perspective view illustrating the sample holder 100, and FIG. 3 is a cross-sectional view illustrating the sample holder 100 taken along a line A-A' of FIG. 2. Referring to FIGS. 2 and 3, the sample holder 100 includes a body 101, a grip part 102 provided on a top of the body 101, and a sample-mounting part 103 provided on a bottom of the body 101. The body 101 may have the shape of a discus formed of a metal. The grip part 102, for example, may have an upwardly projected shape from the body 101 in the discus shape and may include a groove 102a formed in a side thereof. The groove 102a is for ensuring a mounting unit 300 does not separate while mounting/dismounting the sample holder 100 onto/from the sample rack 200. A shape of the groove 102a is not limited to the exemplary embodiment shown in FIG. 3.

The sample 4, for example, may be mounted on a bottom surface 104 of the body 101. In this case, the sample-mounting part 103 on which the sample 4 is mounted is provided on a part of the bottom surface 104. The sample-mounting part 103 may be provided on a part of the bottom surface 104 of the body 101, corresponding to a hollow part 201 (refer to FIG. 4) of the sample rack 200 to allow the probe 2 to access the sample 4. The sample-mounting part 103 may be the same surface as the bottom surface 104. Also, although not shown in the drawings, the sample holder 100 may include a clamper or a clip for fastening the sample 4 to the sample-mounting part 103.

The bottom surface 104 of the body 101 may be supported by a supporter 205 (refer to FIG. 4) provided in the sample rack 200 while the sample holder 100 is being mounted on the sample rack 200. In this case, the bottom surface 104 may become a seating part 105. The seating part 105 may be provided outside of an inner part of the bottom surface 104 of the body 101, the inner part of the bottom surface 104 corresponding to the hollow part 201 of the sample rack 200. The seating part 105 may be the same surface as (i.e. may be flush with) the bottom surface 104 of the body 101. Also, although not shown in the drawings, the seating part 105 may be recessed or may be projected from the bottom surface 104. Also, the seating part 105 may be the same surface as (i.e. may be flush with) the sample-mounting part 103 or may be a recessed or projected surface with respect thereto. A part or the whole of an outer surface 106 of the body 101 may function as a lateral movement restricting part for restricting a lateral movement of the sample holder 100 while being mounted on the sample rack 200.

The sample holder 100 may include a wing 107 extended outward from the outer surface 106 of the body 101. The wing 107 may function as a rotation-restricting part for restricting a rotation of the sample holder 100 with respect to the sample rack 200 while the sample holder 100 is being mounted on the sample rack 200. A plurality of wings 107 may be provided and may be extended outward in a radial direction. In FIGS. 2 and 3, although the sample holder 100 includes three wings 107, the exemplary embodiment is not limited thereto.

Figure 4:
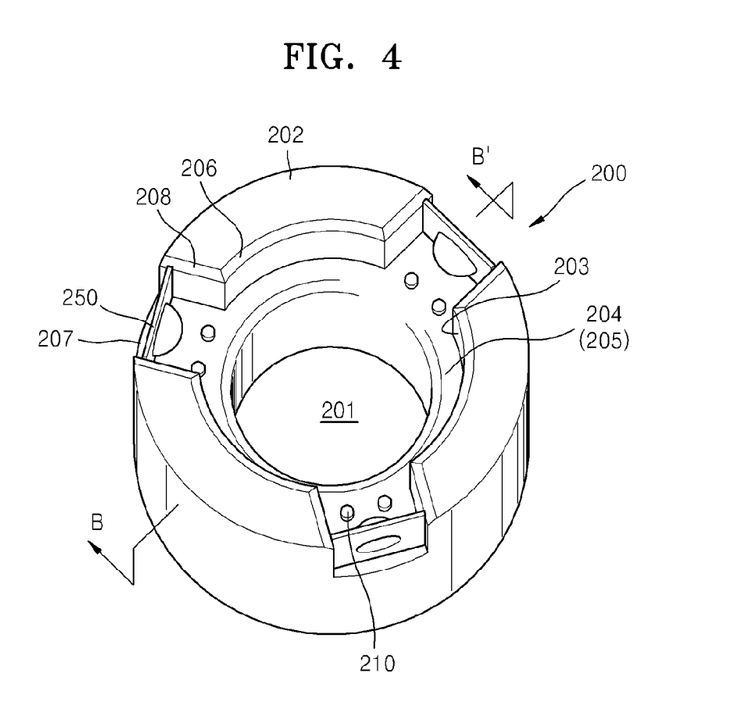
FIG. 4 is a perspective view illustrating a sample rack according to an exemplary embodiment.
Figure 5:
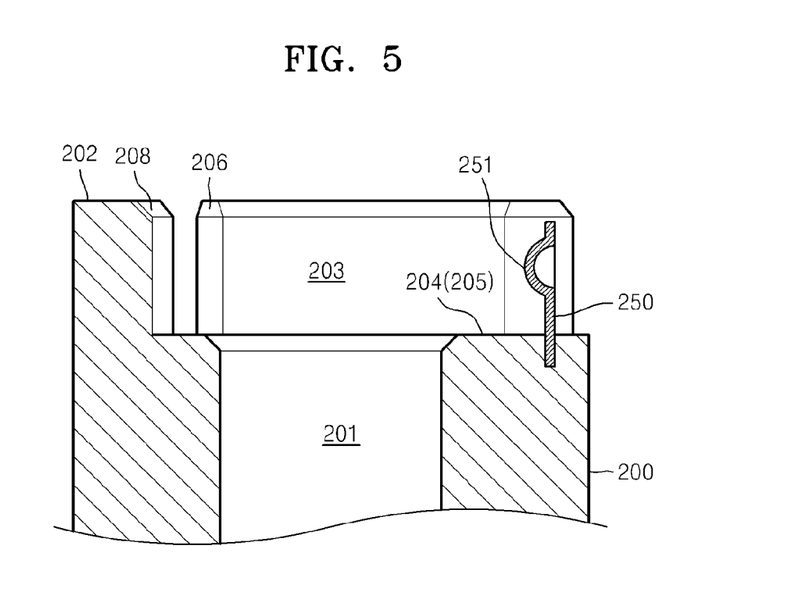
FIG. 5 is a cross-sectional view illustrating the sample rack taken along a line B-B' of FIG. 4.

FIG. 4 is a perspective view illustrating the sample rack 200, and FIG. 5 is a cross-sectional view illustrating the sample rack 200 taken along a line B-B' of FIG. 4. Referring to FIGS. 4 and 5, the sample rack 200, for example, may be formed in a cylindrical shape and may be formed of a metal. The sample rack 200 may include the hollow part 201 in which the probe 2 is arranged. Although not shown in detail in the drawings, a driving element for allowing the probe 2 to access or be separated from the sample 4 and for minutely driving the probe 2 in a lateral direction if necessary may be included in the sample rack 200. The sample rack 200 may include a recessed part 203 depressed downwardly from a top surface 202 of the sample rack 200 towards a bottom surface 204 of the recessed part 203 of the sample rack 200. The bottom surface 204 of the recessed part 203 may become the supporter 205 supporting the seating part 105 of the sample holder 100. The supporter 205 may have any shape capable of supporting the seating part 105. For example, although not shown in the drawings, the supporter 205 may have a shape partially projected from the bottom surface 204 of the recessed part 203. A shape of the recessed part 203 may be a shape capable of containing the body 101 of the sample holder 100. For example, to contain the outer surface 106 of the body 101 of the sample holder 100, a diameter of the recessed part 203 may be greater than a diameter of the outer surface 106 of the body 101 within a tolerance range. Also, when the sample holder 100 is being mounted on the sample rack 200, to easily insert the body 101 into the recessed part 203, a chamfer part 206 may be provided on an edge of a top of the recessed part 203. The chamfer part 206 may have a round shape or a chamfer shape.

A cavity 207 may be provided in the sample rack 200. The cavity 207 receives the wing 107 of the sample holder 100 and restricts the rotation of the sample holder 100 and is formed to correspond to the shape of the wing 107 of the sample holder 100. For example, the cavity 207 may be formed to be open in a radial direction in an outer wall surrounding the recessed part 203. In the present exemplary embodiment, although three of the cavities 207 are included in the sample rack 200, the exemplary embodiment is not limited thereto. To allow the wing 107 to be easily inserted into the cavity 207 from above, a chamfer part 208 may be provided on an upper edge of the cavity 207. The chamfer part 208 may have a round shape or a chamfer shape.

An elastic element 250 is provided in the sample rack 200. The elastic element 250 applies an elastic force to the sample holder 100 to be fastened to the sample rack 200 while the sample holder 100 is being mounted on the sample rack 200 and the seating part 105 is supported by the supporter 205. The elastic element 250 provides the sample holder 100 with a pressing force inclined with respect to a vertical direction which is perpendicular to the radial/lateral direction. As an example, as shown in FIGS. 4 and 5, the elastic element 250 may be a leaf spring fastened to the sample rack 200. For example, one end of the elastic element 250 is fastened to the sample rack 200 and another end thereof includes a pressurizing part 251 pressurizing the body 101 of the sample holder 100 while being in contact therewith. The pressurizing part 251, as shown in FIG. 5, may have a convex shape toward the inside of the sample rack 200. The elastic element 250 may be formed of a spring plate having elasticity. As the elastic element 250, for example, beryllium copper (BeCu), tantalum (Ta), stainless steel, Inconel, etc. are used, which may maintain a stable pressing force at a low temperature, and additionally, in an extremely low temperature environment.

The elastic element 250 may be located in the cavity 207. Accordingly, the elastic element 250 may pressurize the wing 107 while the sample holder 100 is being mounted onto the sample rack 200.

Figure 6A:
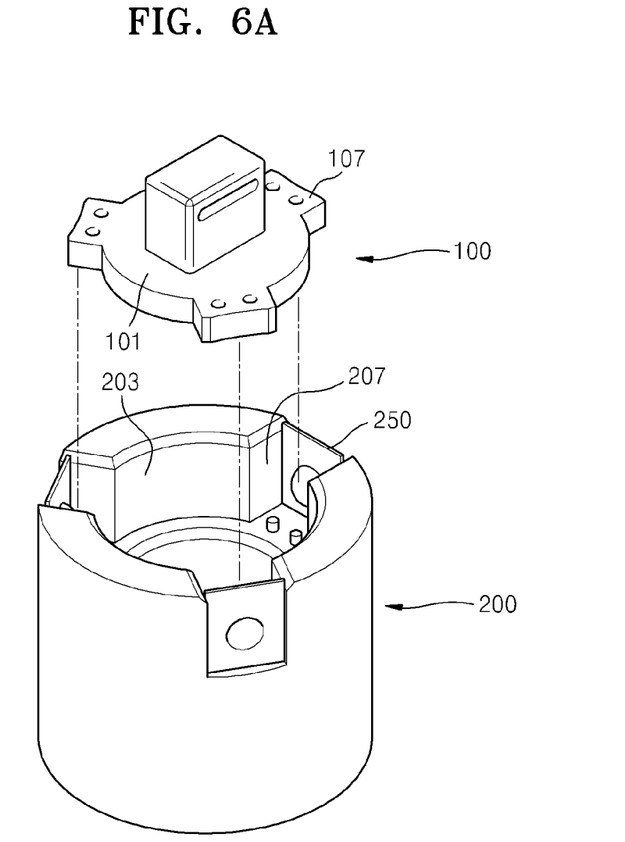
FIGS. 6A through 6C are perspective views illustrating a process of mounting the sample holder onto the sample rack according to an exemplary embodiment.
Figure 6B:
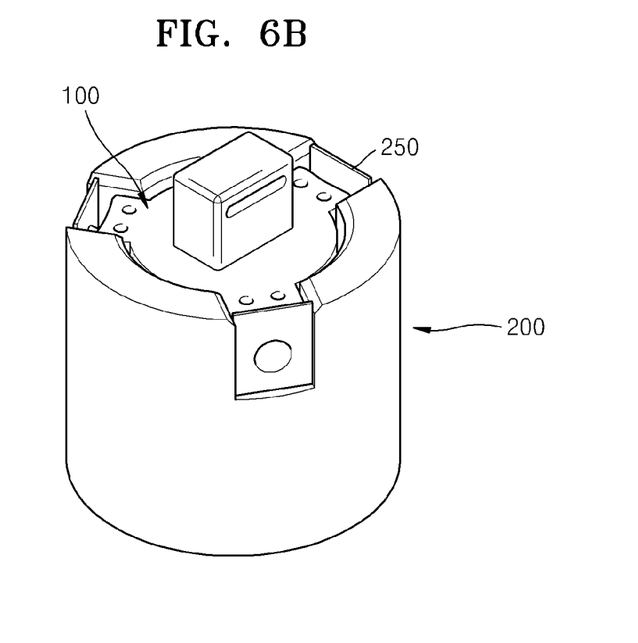
Figure 6C:
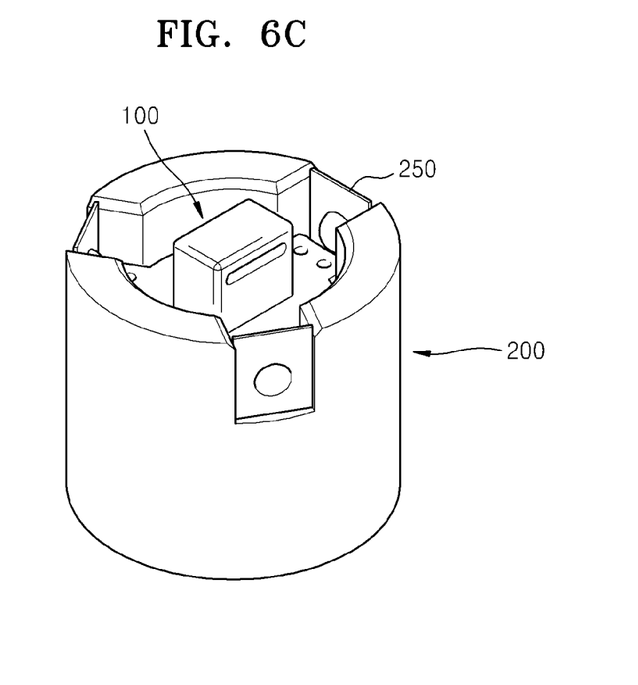
Figure 7:
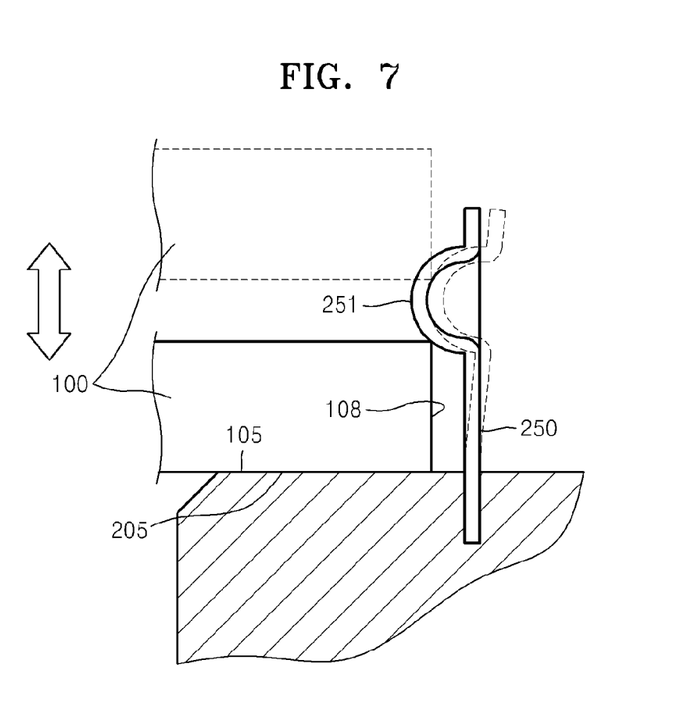
FIG. 7 is a cross-sectional view illustrating a state in which an elastic element is deformed and pressurizes the sample holder while the sample holder is mounted on the sample rack according to an exemplary embodiment.

FIGS. 6A to 6C are perspective views illustrating a process of mounting the sample holder 100 onto the sample rack 200, and FIG. 7 is a cross-sectional view illustrating a state in which the elastic element 250 is deformed and pressurizes the sample holder 100 while the sample holder 100 is mounted on the sample rack 200.

Referring to FIGS. 6A to 6C and 7, to mount the sample holder 100 onto the sample rack 200, the sample holder 100 is inserted into the recessed part 203 from above. In this case, the body 101 and the recessed part 203 are aligned with each other and the wing 107 and the cavity 207 are aligned with each other, thereby inserting the body 101 and the wing 107 into the recessed part 203 and the cavity 207, respectively. As the sample holder 100 is mounted, an outer surface 108 of the wing 107 is in contact with the pressurizing part 251 of the elastic element 250 and the elastic element 250 is pushed outward by the wing 107. When the outer surface 108 of the wing 107 is in contact with a most convex part of the pressurizing part 251, a deformation amount of the elastic element 250 is greatest. When the sample holder 100 is inserted more in a downward direction, the deformation amount of the elastic element 250 decreases and starts to return inward. When the sample holder 100 is perfectly inserted into the recessed part 203 and the seating part 105 is supported by the supporter 205, the pressurizing part 251 pressurizes the sample holder 100 while being in precise contact with the outer surface 108 of the wing 107, strictly, an upper edge of the outer surface 108 of the wing 107. Accordingly, an inclined pressing force having a lateral/radial component and a downward component is applied to the sample holder 100 in such a way that the sample holder 100 does not move upwardly and the seating part 105 is tightly supported by the supporter 205. Also, the outer surface 106 of the body 101 of the sample holder 100 is supported by an inner wall of the recessed part 203, thereby restricting a lateral/radial movement of the sample holder 100. Also, the wing 107 is inserted into the cavity 207, thereby restricting the rotation of the sample holder 100. Accordingly, the sample holder 100 may be stably mounted on the sample rack 200. A process of dismounting the sample holder 100 is in a reverse order compared to that of the mounting process.

First and second electric contact points 210 and 110 may be provided, respectively, on locations facing each other in a vertical direction of the sample rack 200 and the sample holder 100. Referring to FIG. 4, the first electric contact point 210 may be provided on one of the bottom surface 204 of the sample rack 200 and the supporter 205. Referring to FIG. 2, the second electric contact point 110 may be provided on one of the bottom surface 104 of the sample holder 100 and the seating part 105. In the configuration as described above, when the sample holder 100 is mounted on the sample rack 200, the first and second electric contact points 210 and 110 may be electrically connected to each other and may provide power to the sample holder 100. The sample holder 100 may include a heater (not shown) for heating the sample 4 if necessary. Also, when the sample 4 is a semiconductor circuit device, it may be necessary to supply power for driving the circuit device. The first and second electric contact points 210 and 110 are electrically connected to each other, thereby providing the heater or the circuit device with power. One of the first electric contact point 210 and the second electric contact point 110 may have a configuration capable of being elastically movable in a vertical direction. This configuration may be embodied by using a leaf spring formed of a conductive material having elasticity as one of the first electric contact point 210 and the second electric contact point 110. As another example, the configuration may be embodied by using elastic elements (not shown) elastically supporting one of the first electric contact point 210 and the second electric contact point 110 toward one of the sample rack 200 and the sample holder 100.

Figure 8:
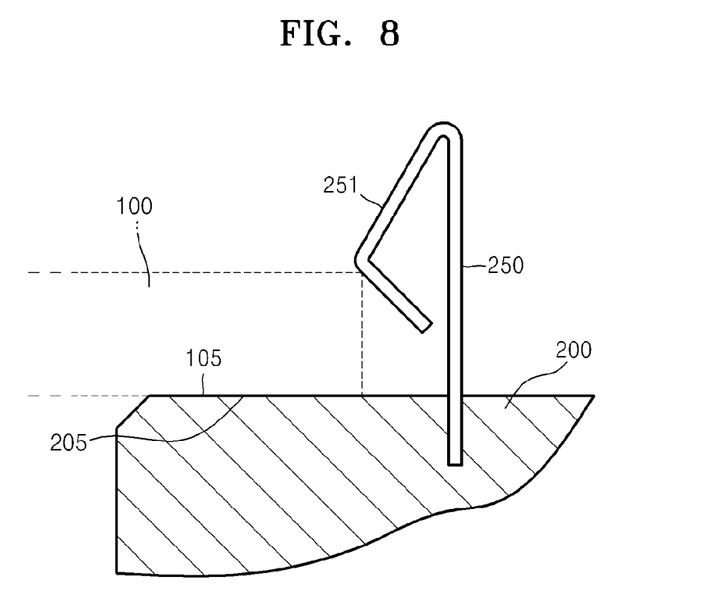
FIG. 8 is a cross-sectional view illustrating an example of the elastic element according to an exemplary embodiment.

In the present exemplary embodiment, the pressurizing part 251 formed by embossing-processing a leaf spring is used but the present invention is not limited thereto. The pressurizing part 251 may have any shape capable of pressurizing the sample holder 100 with a lateral component and a downward component. For example, as shown in FIG. 8, the pressurizing part 251 may be formed by bending a leaf spring to be convex inward.

Figure 9:
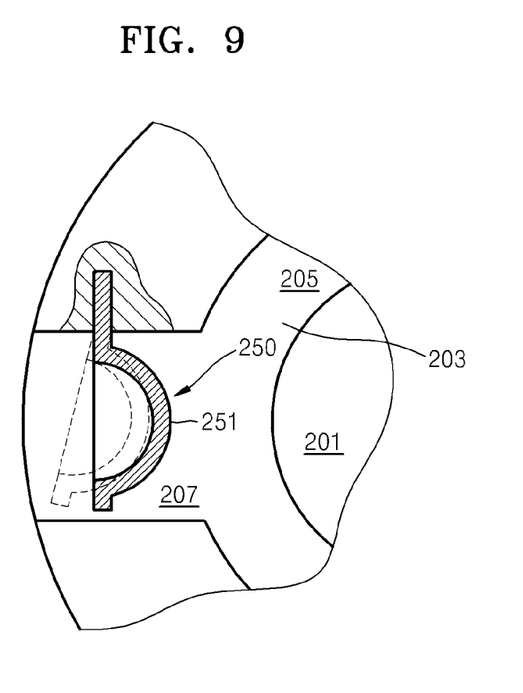
FIG. 9 is a partial cross-sectional view illustrating the elastic element according to an exemplary embodiment.

Also, the elastic element 250 is not limited to the shape supported by the sample rack 200 in a vertical direction. For example, as shown in FIG. 9, the elastic element 250 may be supported by the sample rack 200 in a lateral/radial direction.

As described above, the sample stage 1 having the vertical mounting structure is used in such way that the mounting/dismounting processes of the sample holder 100 is embodied by simple pushing and pulling operations in a vertical direction and it is unnecessary to move in a lateral/radial direction or to rotate. Accordingly, the sample holder 100 may be very stably mounted onto or dismounted from the sample rack 200 and damage to the sample rack 200 may be reduced in the mounting/dismounting processes. Also, since the sample holder 100 may be mounted or dismounted in a vertical direction, the first and second electric contact points 210 and 110 may be electrically stably connected to each other with less thermal or mechanical stresses. Also, in a low temperature-low pressure (vacuum) environment, the sample holder 100 may be stably mounted or dismounted.

Figure 10:
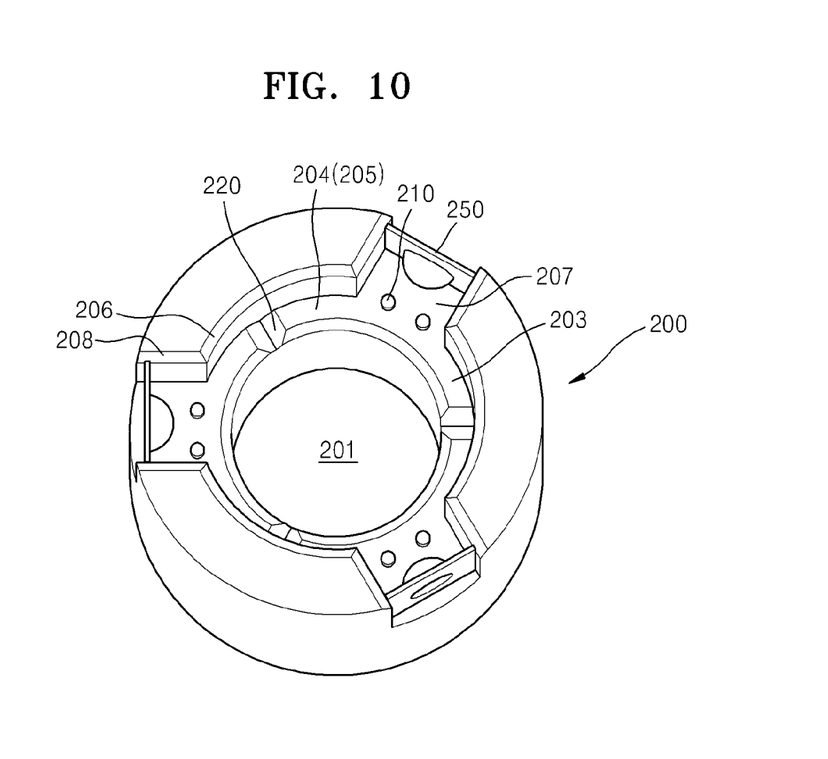
FIG. 10 is a perspective view illustrating the sample holder with a V-shaped groove according to an exemplary embodiment.
Figure 11:
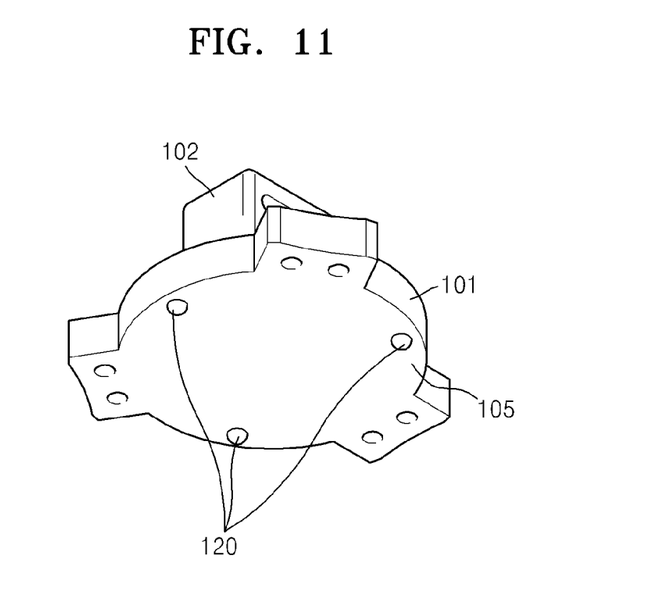
FIG. 11 is a perspective view illustrating the sample holder with a position-determining projection according to an exemplary embodiment.

In the present exemplary embodiment, although the rotation of the sample holder 100 is restricted by a combination between the wing 107 and the cavity 207 and the lateral/radial movement of the sample holder 100 is restricted by a combination between the outer surface 106 of the body 101 and an inner surface of the recessed part 203, the present invention is not limited thereto. For example, referring to FIG. 10, the sample rack 200 may include a V-shaped groove 220 carved downwardly in a V shape from one of the bottom surface 204 and the supporter 205. Referring to FIG. 11, a position-determining projection 120 having, for example, a globular shape projected from one of the bottom surface 104 and the seating part 105 of the sample holder 100 may be provided. When the sample holder 100 is mounted on the sample rack 200, the position-determining projection 120 is positioned in the V-shaped groove 200. To restrict the lateral/radial movement, two or more of the V-shaped grooves 220 not parallel to one another and two or more of the position-determining projections 120 are provided on the sample rack 200 and the sample holder 100, respectively. In this case, the wing 107 and the cavity 207 may be unnecessary. However, the cavity 207 may be formed to be greater than the wing 107 to assist aligning of the V-shaped groove 220 with the position-determining projection 120 while the sample holder 100 is being mounted on the sample rack 200. In the structure in which the position-determining projection 120 is supported by the V-shaped groove 220, it is unnecessary to additionally provide the seating part 105 and the supporter 205 and the position-determining projection 120 and the V-shaped groove 220 may function as the seating part 105 and the supporter 205.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A sample stage for microscopy, capable of being vertically mounted, the sample stage comprising:
   a sample holder comprising a body having a sample-mounting part and a seating part provided on a bottom of the body;
   a sample rack, on which the sample holder is mounted, comprising a supporter configured to support the seating part of the sample holder; and
   an elastic element provided on the sample rack, configured to provide the sample holder with a pressing force inclined with respect to a vertical direction and configured to fasten the sample holder to the sample rack.

2. The sample stage of claim 1, wherein the elastic element is configured to be pushed outward by the sample holder in response to the sample holder being mounted on the sample rack.

3. The sample stage of claim 2, wherein the elastic element comprises a leaf spring supported by the sample rack.

4. The sample stage of claim 2, wherein the elastic element is formed of one of beryllium copper (BeCu), tantalum (Ta), stainless steel, and Inconel.

5. The sample stage of claim 1, wherein the sample rack further comprises a recessed part depressed from a top surface of the sample rack configured to receive the body, and
   wherein a bottom surface of the recessed part comprises the supporter.

6. The sample stage of claim 5, wherein the sample rack further comprises a cavity provided in an outer wall surrounding the recessed part of the sample rack, and
   wherein the sample holder comprises a wing configured to be inserted into the cavity is provided on the sample holder.

7. The sample stage of claim 6, wherein the cavity of the sample rack and the wing of the sample holder are configured to restrict a rotation of the sample holder with respect to the sample rack.

8. The sample stage of claim 6, wherein the elastic element is provided in the cavity.

9. The sample stage of claim 1, wherein one of the seating part and the supporter comprises two or more V-shaped grooves not parallel to one another and the other of the seating part and the supporter comprises a position-determining projection having a globular shape configured to be inserted into the V-shaped groove, and wherein the V-shaped groove and the position-determining projection are configured to restrict a rotation and a lateral movement of the sample holder with respect to the sample rack.

10. The sample stage of claim 1, wherein a first electric contact point is provided on the supporter of the sample rack, and wherein a second electric contact point in contact with the first electric contact point is provided on the seating part of the sample holder.

11. A sample stage for microscopy, capable of being vertically mounted, the sample stage comprising:

a sample rack comprising:
  a recessed part; and
  a plurality of V-shaped grooves provided on a bottom surface of the recessed part and are not parallel to one another;
a sample holder comprising:
  a body inserted into the recessed part, and
  a plurality of position-determining projections protruding from a bottom surface of the body and supported by the plurality of V-shaped grooves; and
an elastic element provided on the sample rack, configured to provide the sample holder with a pressing force inclined with respect to a vertical direction and configured to fasten the sample holder to the sample rack.

12. The sample stage of claim 11, wherein the elastic element comprises a leaf spring providing the sample holder with the pressing force generated by a force of the leaf spring being pushed outward by the sample holder and returning in response to the sample holder being mounted on the sample rack.

13. The sample stage of claim 11, wherein the sample rack further comprises a cavity provided in an outer wall surrounding the recessed part in the sample rack, and wherein the sample holder further comprises a wing configured to be inserted into the cavity.

14. The sample stage of claim 13, wherein the elastic element is provided in the cavity.

15. The sample stage of claim 11, wherein a first electric contact point is provided on the bottom surface of the sample rack, and wherein a second electric contact point in contact with the first electric contact point is provided on the bottom surface of the sample holder.

16. A scanning probe microscope comprising:

a sample stage for microscopy configured to be vertically mounted, the sample stage comprising:
  a sample holder comprising a body in which a sample-mounting part and a seating part are provided on a bottom of the body;
  a sample rack, on which the sample holder is mounted, comprising a supporter configured to support the seating part of the sample holder; and
  an elastic element provided on the sample rack, configured to provide the sample holder with a pressing force inclined with respect to a vertical direction and configured to fasten the sample holder to the sample rack;
a probe configured to access a sample mounted on the sample-mounting part via a hollow part provided in the sample rack; and
a control unit configured to derive a measurement result from at least one of mechanical, electrical, and chemical signals received from the probe.

17. The microscope of claim 16, wherein the sample rack further comprises:

a recessed part depressed from a top surface of the sample rack and receiving the body; and
a cavity provided in an outer wall surrounding the recessed part, and
wherein the sample holder further comprises a wing configured to be inserted into the cavity.

18. The microscope of claim 17, wherein the elastic element is provided in the cavity.

19. The microscope of claim 16, wherein one of the seating part and the supporter comprises two or more V-shaped grooves that are not parallel to one another and the other of the seating part and the supporter comprises a position-determining projection having a globular shape configured to be inserted into the V-shaped groove, and wherein the V-shaped groove and the position-determining projection are configured to restrict a rotation and a lateral movement of the sample holder with respect to the sample rack.

20. The microscope of claim 16, wherein a first electric contact point is provided on the supporter of the sample rack, wherein a second electric contact point in contact with the first electric contact point is provided on the seating part,
wherein the first and second electric contact points are in contact with one another while the sample holder is being mounted on the sample rack.

* * * * *